Patented July 8, 1941

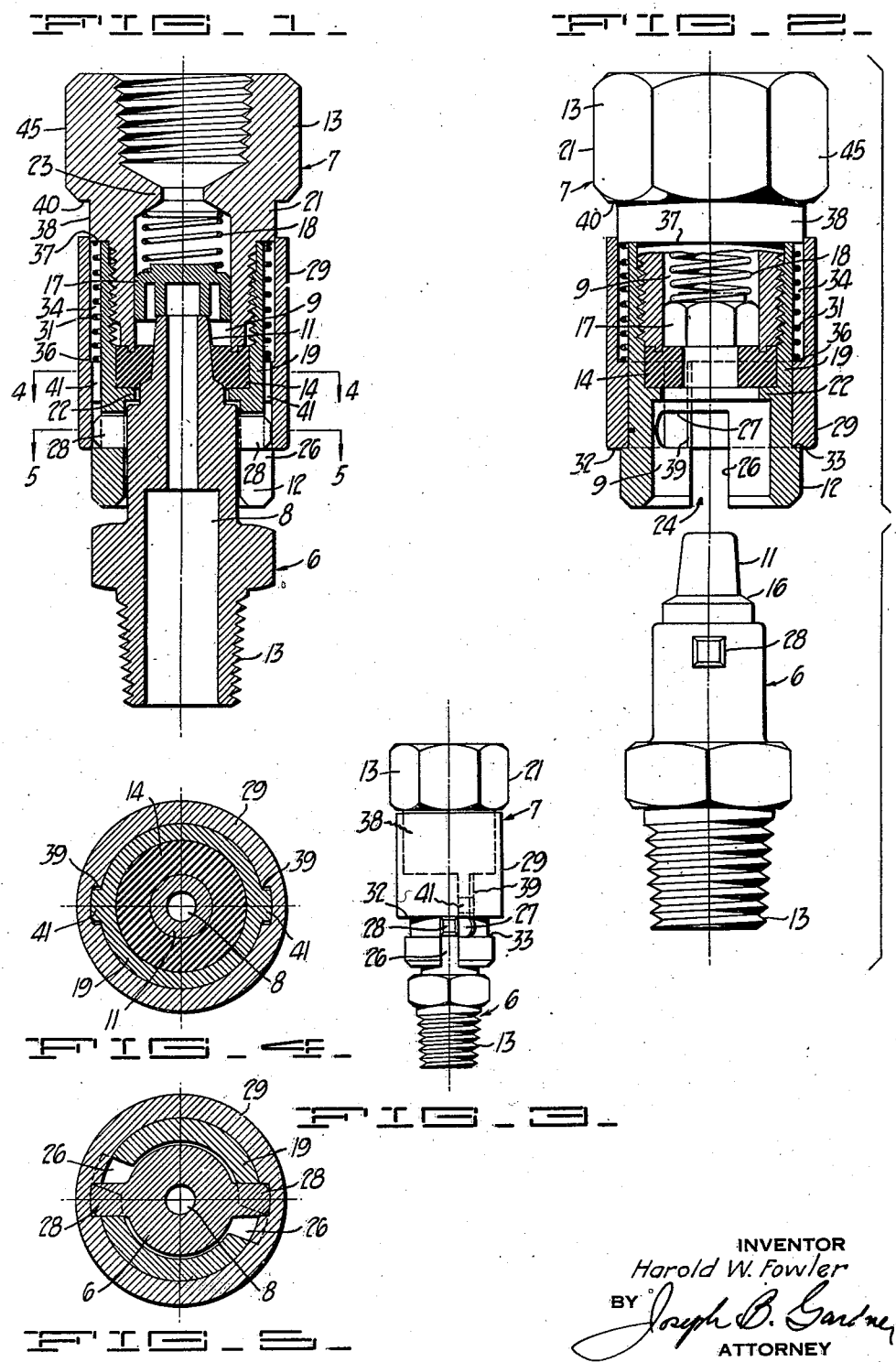

2,248,701

UNITED STATES PATENT OFFICE 2,248,701

COUPLING

Harold W. Fowler, Goshen, Ind.

Application September 9, 1939, Serial No. 294,149

4 Claims. (Cl. 284—19)

The invention relates to couplings used for attaching and detaching portions of fluid circuits, particularly air pressure systems, and which generally comprise a pair of detachable coupling sections, such as disclosed in Mitchell et al. Patent No. 2,044,252.

An object of the invention is to provide a coupling of the character described including a pair of detachable coupling sections which are arranged and constructed to provide a positive locking of the sections in attached position as against any forced twisting or longitudinal thrust of the sections as may be occasioned by ordinary or rough handling and usage of the sections.

Another object of the invention is to provide a coupling of the character described, wherein the sections may be quickly and readily attached and detached upon proper manipulation of the section parts and wherein the sections will upon longitudinal and rotative engagement, automatically move into the positively locked position above described.

A further object of the invention is to provide a coupling of the character described which will be constructed in a manner concealing the means of detachment of the coupling sections to thereby minimize the possibility of a surreptitious removal of the coupling sections and a theft of an air inflator and gauge parts or the like adapted to be attached to an air line by means of the coupling.

The invention possesses other objects and features of advantage, some of which, with the foregoing will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a longitudinal sectional view of a coupling constructed in accordance with the present invention.

Figure 2 is a side elevation of the coupling with the sections thereof detached and one of the sections broken away in part and shown in section.

Figure 3 is a side elevation of the coupling shown with the parts in longitudinally attached but not rotated position.

Figure 4 is a cross-sectional view of the coupling taken substantially on the plane of line 4—4 of Figure 1.

Figure 5 is a cross-sectional view of the coupling taken substantially on the plane of line 5—5 of Figure 1.

The coupling of the present invention consists briefly of a pair of telescopically engaged coupling sections, each of tubular form and adapted for connection at their outer ends to the connecting conduits of an air pressure or other fluid system. The sections are held in engagement by means of a bayonet fastening means including a bayonet slot in the outer member and a lug on the inner member and in accordance with this construction the sections are attached by entering the inner section into one end of the outer section to a longitudinally attached position and then rotating the inner section relative to the outer section so as to lock the lug in the bayonet slot. In accordance with the present invention means is carried by the outer section which is engaged and displaced by the lug and automatically moved into a locked position therewith upon circumferential movement of the lug whereby the sections may be released in attached position only by a purposeful displacement of the aforementioned means.

With reference more specifically to the accompanying drawing, the coupling therein depicted comprises a pair of inner and outer sections 6 and 7, each of tubular cross-section providing aligned bores 8 and 9 for passage of fluid therethrough and which are adapted for telescopic engagement at their ends 11 and 12 and are preferably threaded at their opposite ends 13 to facilitate the connection of the sections to a fluid line. Means for sealing the sections against leakage when coupled here comprises a packing washer 14 which is mounted in the passage 9 and arranged to engage about the end 11 of the other section, the latter end being preferably formed with a slight taper to afford a wedged engagement in the washer and also being formed with an annular shoulder 16 for supporting the washer against the fluid flow and pressure when the sections are in attached position. The washer further serves in a detached position of the members as a seat for a valve 17 mounted for axial movement in the passage 9 and which is normally urged by a spring 18 to seat the valve against the washer in passage closing position and is displaceable from such position only by and upon insertion of the section end 11 through the washer.

As here shown, the section 7 is formed of two parts, including a main body casing 19 and a hollow end plug 21 which defines the aforementioned engageable outer end 13 of the section and which extends centrally into the casing 19 for clamping the washer 14 in position against a retaining shoulder 22 provided in the bore of the casing 19. The valve 17 is thus positioned in the end portion of the member 21 and the latter is provided with an internal shoulder 23 for supporting one end of the spring 18 which is compressed between the shoulder 23 and the valve 17 for urging the valve to a seated position on the washer 14. The valve may be provided with a polygonal outer wall, as here shown, for slidably supporting the valve in the cylindrical bore of the member 21, leaving clearance for passage of fluid thereby. Thus with the members in a detached position, as illustrated in Figure 2, the valve will be firmly seated against the washer 14 to seal off the passage through the section 7 and in an attached position of the sections the end 11 of the male section will displace the valve 17 from its seat and at the same time seal tightly in the opening through the washer 14.

Bayonet means are here provided for holding the sections in attached position and for providing a quick and ready attachment and detachment of the sections. As here shown, the end 12 of the casing 19 is formed with a bayonet slot 24 including a longitudinal part 26 which extends to the open end of the casing, and a transverse or circumferential part 27 which extends laterally from the inner end of the longitudinal part 26. The section 6 is provided with a lug 28 which extends outwardly from the periphery of the section in spaced relation to the outer end 11 thereof and which is adapted to slide into and through the longitudinal part 26 of the bayonet slot upon longitudinal attachment of the sections and into the circumferential part 27 upon relative rotation of the sections when in longitudinally attached position. Preferably, a pair of bayonet slots 24 and a pair of lugs 28 are provided at the diametrically opposite parts of the sections.

In accordance with the above construction the sections are positively held in longitudinal separation when in attached position, but upon relative rotation the lugs 28 may be displaced into a position in alignment with the longitudinal slot parts 26 and release the sections for longitudinal withdrawal. To prevent any accidental or surreptitious removal of the sections in this manner, I provide means on the outer section which is operatively engaged and displaced by the lugs upon movement of the latter to an attached position of the sections and which automatically moves into a locking position with the lugs holding the latter against relative circumferential movement when in attached position. Such means is here illustrated in the form of a sleeve 29 which is slidably mounted on the outer periphery of the casing 19 and which is normally urged lengthwise on the casing by means of a helical spring 31 so as to engage one end 32 of the sleeve against a shoulder 33 on the casing adjacent the end 12 of the section. The spring is here confined within an enlarged bore section 34 in the sleeve and is compressed between a shoulder 36 at one end of the bore 34 and a shoulder 37 on the end member 21 which is of a diameter adapted to enter the bore 34 upon sliding of the sleeve away from the end 12 of the section to permit sliding of the sleeve over a cylindrical part 38 on the end nut 21 up to a shoulder 40 on the nut. The remainder of the nut periphery 45 is preferably of polygonal form for gripping with a wrench. The sleeve is preferably of a length to completely cover and conceal the spring 31 in all positions of the sleeve. The sleeve is held against rotation on the casing 19 by means of a pair of longitudinal keyways 39 (see Figure 4) which are engaged by keys 41 formed on the periphery of the casing. In accordance with the present construction, these keys and keyways are arranged in longitudinal alignment with the lugs 28 when the latter are rotated to engage in the circumferential part 27 of the bayonet slots and the keyways are of a width permitting the sleeve to slide longitudinally over the lugs when the latter are moved into alignment with the keyways. As here shown, the lugs extend through the body of the casing at least behind the shoulder 33, whereby upon longitudinal insertion of the lugs (see Figure 3) the same will engage the sleeve end 32 and longitudinally displace the same against the resilient resistance of spring 31 and upon relative rotation of the sections, to place the lugs in alignment with the keyways 39, the sleeve will be automatically moved by the spring 31 to engage the keyways with the lugs 28 and thereby positively hold the latter against rotation relative to the bayonet slot. In this manner detachment of the sections can only be effected by drawing the sleeve longitudinally away from the lugs so as to enable the circumferential movement of the latter into the longitudinal part of the bayonet slot.

In the attached position of the sections, as illustrated in Figure 1, the sleeve completely overlies, covers and conceals the lugs and thereby conceals the mode of operation for effecting a detachment of the sections. It will be understood that no amount of longitudinal thrust or rotational stress placed on the sections will effect their detachment and accordingly, a surreptitious removal of apparatus attached to the fluid lines by means of the coupling is to a large extent avoided. On the other hand, the operator in charge of the apparatus may quickly and readily detach the sections by merely first longitudinally displacing the sleeve, as illustrated in Figure 3, and then rotating and longitudinally withdrawing the sections.

I claim:

1. A coupling comprising, inner and outer tubular sections adapted for telescopic engagement at the ends thereof, the outer of said sections being formed with a bayonet slot having connected longitudinal and transverse parts at said end, a member carried by the inner section adjacent said end thereof and engageable in said slot parts and extending through the body of said outer section and projecting from the outer side thereof, and a sleeve carried by the outer section and engaged and longitudinally displaced thereon by said member upon movement of the latter through said longitudinal slot part and having a longitudinally extending groove adapted to register with and engage over said member in a circumferentially displaced position of said member in said transverse slot part to prevent relative rotational displacement of said inner section with respect to said outer section.

2. A coupling comprising, inner and outer telescopically engaged tubular sections adapted for the insertion and withdrawal of one end of said inner section into and from one end of said outer section and adapted for connection of the opposite ends of said sections to fluid conduits, a spring pressed valve in said outer section normally urged to passage closing position therein and engaged and unseated by said first named inner section end on attachment of the sections to place the passages in said sections in communication with each other, a bayonet slot in said outer section including a longitudinal part extending to said first named end of said outer section and a circumferential part extending from the inner end of said longitudinal part, an outstanding lug on said inner section adapted to slide through said longitudinal slot part on attachment of said sections and to lock in said circumferential part on relative rotation of said sections in longitudinally attached position, said lug extending through the body of said outer member and from the outer periphery thereof, and means slidably carried by said outer section at the outer periphery thereof for longitudinal and engaged and displaced by said lug in movement thereof to attached position in said longitudinal slot part and formed with a longitudinal keyway positioned to register with and engage over said lug locking the same against rotative movement relative to said outer section upon movement of said lug into said circumferential slot part.

3. A coupling comprising, a tubular section, a second tubular section adapted for insertion of one end thereof into one end of said first section, said first section being provided with a longitudinal slot extending to said end thereof and a circumferentially extending slot connected to said first slot, a laterally projecting member on said second named section adjacent said end thereof and engageable in said slots upon insertion and rotation of said end in said first section and having a length projecting radially through said slots and from the outer periphery of said first section, a sleeve mounted on the periphery of said first section for longitudinal reciprocation thereon, and a spring urging said sleeve towards said end of said first section, said sleeve having a longitudinal keyway in the internal periphery thereof extending to the end of said sleeve adjacent to said first section end and positioned circumferentially in alignment with said member in a rotated position thereof in said circumferential slot and being of sufficient cross sectional size to receive said member and hold the latter against relative circumferential movement, and means retaining said sleeve and first section against relative rotation.

4. A coupling comprising, a tubular section, a second tubular section adapted for insertion at one end thereof into one end of said first section, said first section having a pair of diametrically opposed bayonet slots opening to said end thereof and a shoulder surrounding said end, each of said slots including a longitudinal slot portion and a circumferential slot portion connected thereto spaced from said end and behind said shoulder, a sleeve slidably carried for longitudinal reciprocation on the outer periphery of said first section and provided with a pair of longitudinal keyways, keys on the outer periphery of said first section engaging in said keyways for holding said sleeve against rotation on said section and being longitudinally aligned with said circumferential slot portions, spring means urging one end of said sleeve against said shoulder, and a pair of lugs mounted on said second section adjacent the end thereof and engageable in said slots and of a length extending therethrough and from the outer side of said first section and having a size fitting into said keyways whereby on insertion of said second section end into said first section end said lugs will engage and longitudinally displace said sleeve and upon rotation of said lugs into said circumferential slot portion register with said keyways to release said sleeve for movement by said spring to longitudinally cover said lugs and lock the latter against rotation out of said circumferential slot portions.

HAROLD W. FOWLER.